(12) United States Patent
Lin

(10) Patent No.: US 8,635,332 B2
(45) Date of Patent: Jan. 21, 2014

(54) SYSTEM AND METHOD FOR IDENTIFYING REAL USERS BEHIND APPLICATION SERVERS

(76) Inventor: YeeJang James Lin, San Jose, CA (US)

( * ) Notice: Subject to any disclaimer, the term of this patent is extended or adjusted under 35 U.S.C. 154(b) by 250 days.

(21) Appl. No.: 12/563,424

(22) Filed: Sep. 21, 2009

(65) Prior Publication Data

US 2010/0121950 A1     May 13, 2010

Related U.S. Application Data

(60) Provisional application No. 61/113,711, filed on Nov. 12, 2008.

(51) Int. Cl.
*G06F 15/173*     (2006.01)

(52) U.S. Cl.
USPC ........................................................ 709/224

(58) Field of Classification Search
USPC ........................................................ 709/224
See application file for complete search history.

(56) References Cited

U.S. PATENT DOCUMENTS 6,289,380 B1 * 9/2001 Battat et al. .................. 709/224
6,311,278 B1 * 10/2001 Raanan et al. ................. 726/14
6,356,917 B1 * 3/2002 Dempsey et al. .................. 1/1
2002/0169824 A1 * 11/2002 Dettinger ...................... 709/203
2004/0117802 A1 * 6/2004 Green ............................ 719/318
2006/0272008 A1 * 11/2006 Shulman et al. .................. 726/2
2007/0266149 A1 * 11/2007 Cobb et al. ..................... 709/224
2010/0088404 A1 * 4/2010 Mani et al. ..................... 709/224

* cited by examiner

*Primary Examiner* — Rupal Dharia
*Assistant Examiner* — Robert B McAdams
(74) *Attorney, Agent, or Firm* — Wang Law Firm, Inc.; Li K. Wang; Stephen Hsu

(57) ABSTRACT

The present invention provides a monitoring device and method for identifying the identity of users requesting database accesses. The data request from application servers to an application server are monitored and parsed. The SQL statements associated with the data request from the application server are also monitored and parsed, so are the SQL responses from the database server. The SQL responses are sent back to the user as data responses. The data responses are also monitored and parsed. The monitoring device matches the parsed data request with the parsed SQL statements, the parsed SQL responses, and the parsed data responses. By matching the string portion of these parsed data, the monitoring device can then identity the identity of the user making such data base quest.

18 Claims, 6 Drawing Sheets

300

| App client | App data | App Server | SQL query | DB Server | DB resp | App Server | data | App Client |
|---|---|---|---|---|---|---|---|---|
| AC1 | a1 | AS1 | b1, b2, b3, b4, b5 | DB1 | c1, c2, c3, c4, c5 | AS1 | d1 | AC1 |
| AC2 | a2 | | | | | | d2 | AC2 |
| AC3 | a3 | | | | | | d3 | AC3 |

| App Client | data | App request | Data string | Return data | App response | Data String |
|---|---|---|---|---|---|---|
| AC1 | a1 | Req(a1) | String(a1) | d1 | Resp(d1) | String (d1) |
| AC2 | a2 | Req(a2) | String(a2) | d2 | Resp(d2) | String (d2) |
| AC3 | a3 | Req(a3) | String(a3) | d3 | Resp(d3) | String (d3) |

FIG. 4

SYSTEM AND METHOD FOR IDENTIFYING REAL USERS BEHIND APPLICATION SERVERS

RELATED APPLICATION

This application claims benefits of the U.S. Provisional Application for A Method For Identifying A User In An Information Access, U.S. Provisional Pat. App. No. 61/113,711, filed on Nov. 12, 2008, the specification of which is included in its entirety by this reference.

BACKGROUND OF THE INVENTION

1. Field of the Invention

The present invention generally relates to data security, and more specifically, relates to a system and method that identify real identity of remote users.

2. Description of the Related Art

Information equals to power and having access to the right information equals having a competitive advantage over others in today's world. Each company closely guards the information essential to their business. Traditionally, the access to sensitive information of each company is restricted to a small number of authorized personnel and tracks the access to this information.

Information access requests received directly from users on the same server where the information is located can be easily associated with the requesting users; however, the information access requests from remote users whose requests are channeled through some application servers cannot be easily associated with the requesting users. Therefore, a malicious user may mask his identity by sending information access requests from a remote machine. The information access requests will go through routers and application servers before being received by a database server. When the information access requests are received by the database server, the database server cannot identify easily the real identity of information requester.

Therefore, there is a need for a system and method that identifies the real identity of a user associated with an information access request and it is to this system the present invention is primarily directed to.

SUMMARY OF THE INVENTION

In one embodiment, the present invention provides a method for identifying the user identity of a user accessing a database by a monitoring device. The monitoring device is connected to a plurality of monitoring points, the monitoring device having at least one monitoring port, a parser, a comparator, and a storage unit. The method comprises the steps of capturing a data request by at least one monitoring port at a first monitoring point, parsing the data request by the parser, capturing a data manipulation command by the at least one monitoring port at a second monitoring point, parsing the data manipulation command by the parser, comparing the parsed data request with the parsed data manipulation command, and if there is a match between the parsed data request and the parsed data manipulation command, associating the parsed data manipulation command with the user identity associated with the data request.

In another embodiment, there is also provided a monitoring device for identifying the user identity of a user accessing a database. The monitoring device includes at least one monitoring port for connecting to a plurality of monitoring points and monitoring data at the plurality of monitoring points, a parser for parsing data captured by the at least one monitoring port, a comparator for comparing the parsed data, and a storage unit for storing the captured data and the parsed data.

The present system and methods are therefore advantageous as they enable identification of real user identity associated with information access requests. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which:

FIG. 3 depicts a table that captures elements of information access requests of FIG. 2;

FIG. 4 illustrates application mapping at application server in FIG. 2;

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The terms "baseline," "baseline information," "baseline database," and "historical behavior information" are used interchangeably.

In an overview, the present invention provides a system and method for identifying real users who make information access requests through application servers. The information regarding data access in the system is collected and analyzed to reveal the real identity of users who hide behind remote application servers.

Figure 1:
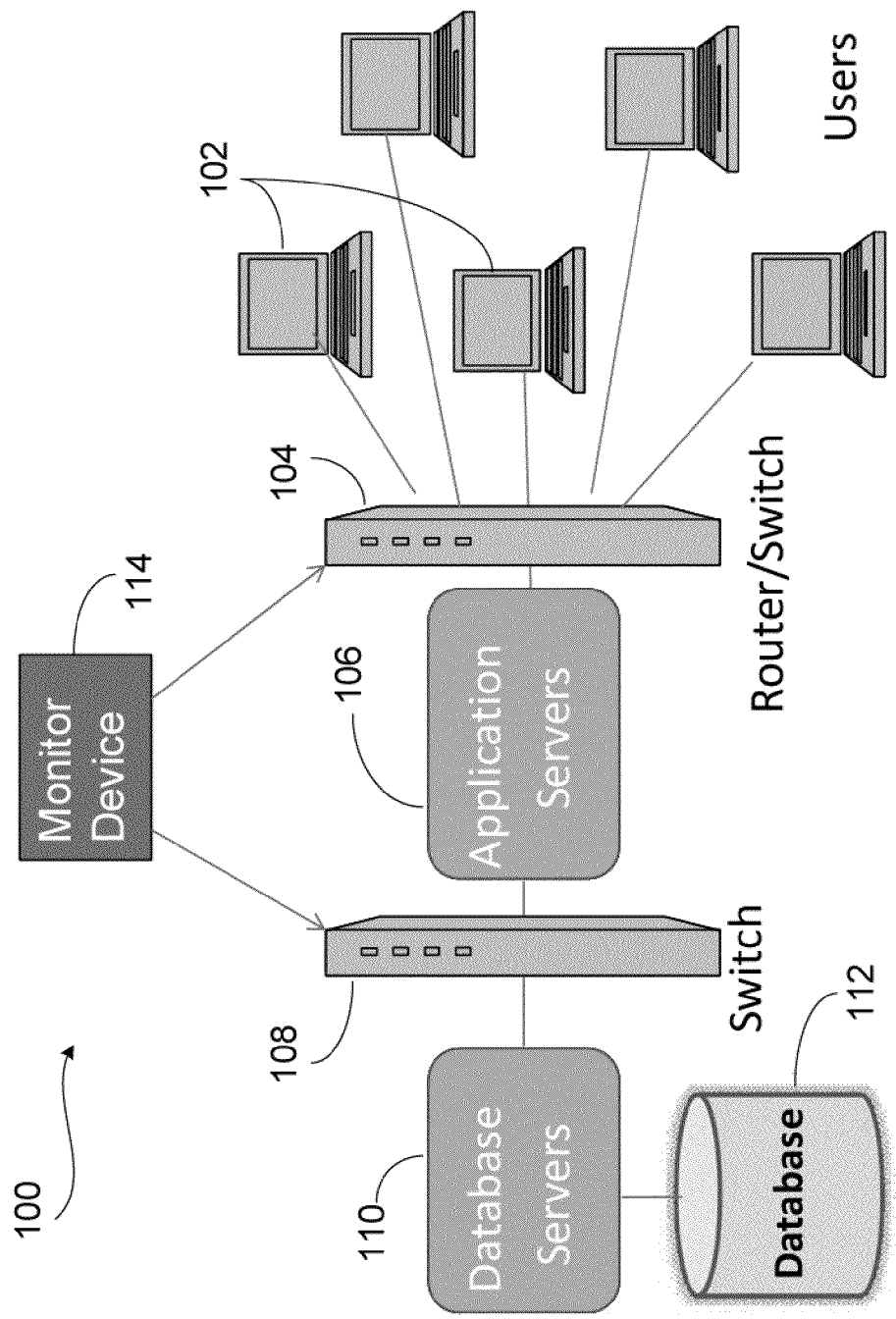
FIG. 1 depicts a network architecture where the present invention can be applied.

FIG. 1 illustrates a network architecture 100 where the present invention can be applied. The remote users may user any of computers, workstations, or terminals 102 connected to a network or a switch/router 104. The users may be workers in a company located in one single location or located in different geographical areas. A user may run an application located on an application server 106 and during execution of the application, requests for certain information located in a database 112 may be requested by the user. The request initiated from a terminal 102 is sent through the router 104 to the application server 106. The application server 106 sends the request to a database server 110. The database server 110 may be connected directly to the application server 106 or may be located remotely from the application server 106 and connected to the application server 106 through a switch 108. After receiving the request, the database server 110 can then retrieve the requested data from a database 112. The requested data then travels back to the terminal 102 from which the request was initiated.

Because there may be multiple requests traveling from different terminals 102 to different database servers 110, it becomes difficult to identify which user is requesting which data. In order to overcome this difficulty and to identify the real identity of a user who request data from a remote terminal, a monitoring device 114 is introduced. The monitoring device 114 monitors data traffic passing through the router 104 and switch 108. Each request from a remote terminal 102 is recorded and its content analyzed. Each response from the database server 110 is also recorded and analyzed. Each database access is broken down into five elements: who, how, where, what, and when. These five elements are defined and explained in the sister application for System And Method For Detecting Behavior Anomaly In Information Access, U.S. patent application Ser. No. 12/431,946, filed on Apr. 29, 2009, the specification of which is incorporated in its entirety by this reference. Each database access is translated into a SQL (structure query language) query and caused a SQL response. Each pair of SQL query and SQL response is then associated to an application user. By analyzing requests, responses, and data traffic through the router 104 and switch 108, association between a data request and a response from the database server 110 can be established and as consequence, the real identity of the user making the data request can then be identified. It is understood that data manipulation commands and responses other than SQL may also be used.

Figure 2:
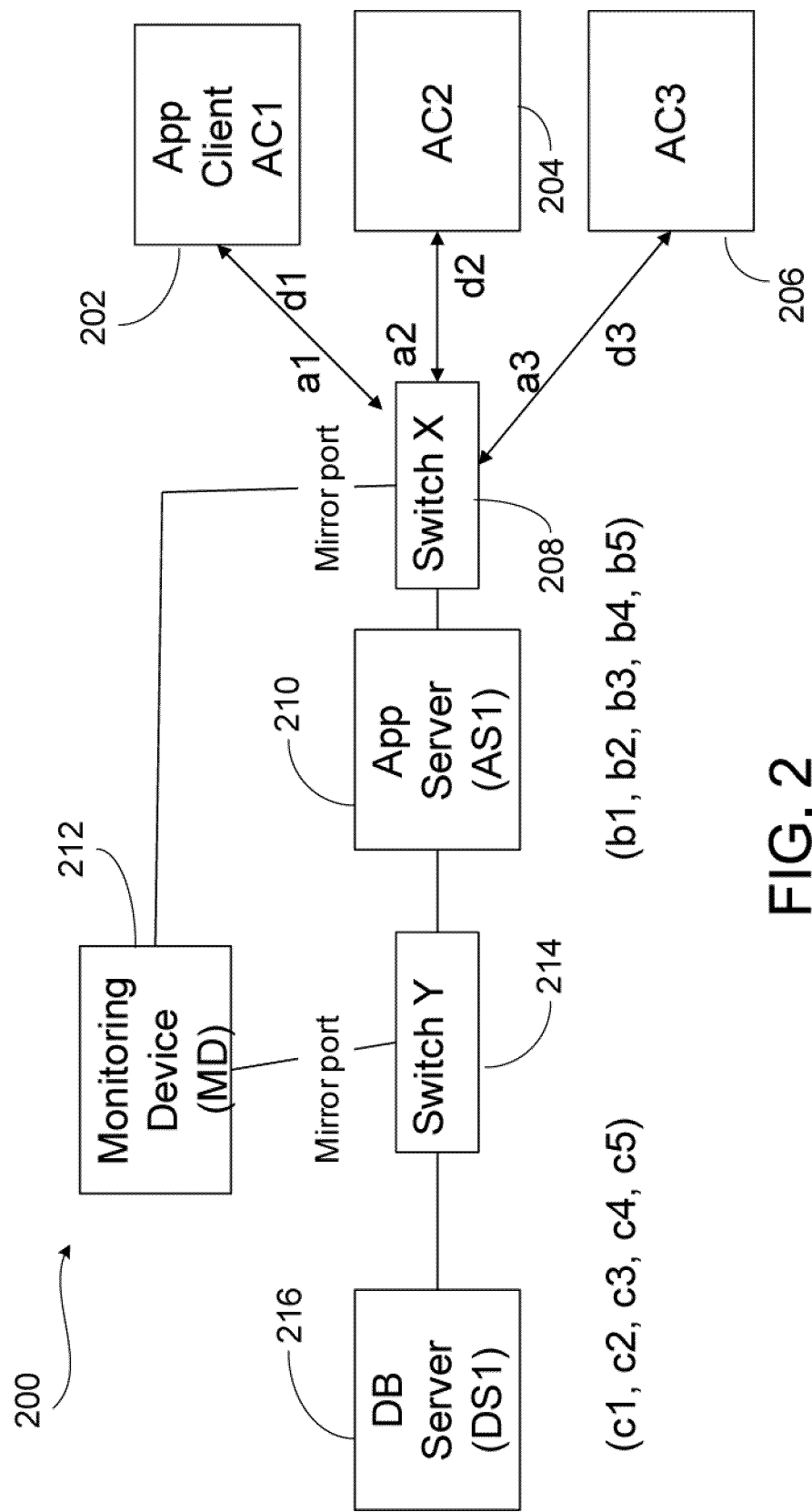
FIG. 2 depicts a model of the computer architecture in which elements of information access requests are identified.

FIG. 2 depicts a model 200 of the computer architecture in which elements of information access requests are identified. The remote terminal 102 is mapped to an application client (AC1, AC2, or AC3) 202. Applicant client (AC) can be seen as real user hidden behind application server (AS1) 210. The application server 210 receives many connections from different application clients 202 and the application server 210 may consolidate application requests from these connections into SQL queries over one or few connections to a database server (DS1) 216. The connections are logic network connection and application queries from an application client are typically mapped to a connection between this application client and the application server. The monitoring device 212 monitors traffic that travels through switch X 208 to the application server (AS1) 210 and also traffic that travels through switch Y 214. The switch X 208 may be one or multiple physical devices; the switch Y 214 may also be one or multiple physical devices. The traffic includes logins, application queries & response to and from the application server 210, and SQL queries & responses to and from the database server 216. The monitoring device 212 can be set to detect login requests and login responses. The user usually logs onto the application server 210 and this login traffic is detected by the monitoring device 212. The login request is forwarded to the database server 216 and the application user account for the application is then retrieved by the database server 216 and sent to the application server 210. The data traffic from the database server 216 is also monitored by the monitoring device 212, which then captures the application user account information. The monitoring device 212 associates each application client with one application user account. The monitoring device 212 may also be able to detect and capture the domain name server, client computer name, and client user login name associated with the application client. The monitoring device 212 is placed in a way that is transparent to the application server 210 and also to the database server 216.

The monitoring device 212 also provides a SQL mapping table that associates a SQL query with its corresponding response to application client 202. An application client AC1 202 initiates an application query "a1" that is sent over a network to application server AS1 210. The application server 210 determines this is a database query destined for the database server 216 and translates "a1" to a SQL query "b1." The "b1" is then sent over a shared connection between application server 210 and database server 216. The database server 216 analyzes the application query request, retrieves the data from the database 112, and responds with "c1." The "c1" is sent back to the application server 210, which then translates "c1" to "d1" and sends "d1" back to the application client AC1 202. The scenario described above is summarized in the table shown in FIG. 3. As it is shown in FIG. 3, one query from an application client may translate into more than one SQL queries. Each SQL query has one corresponding response, and mapping between the query and the response is easy by the fact of "first-in-first-out" behavior in a database query. The application response data $d_i$ returning back from an application server 210 can be mapped back to application query data $a_i$ because they belong to the same connection between application client and application server. Therefore, mapping between ($a_i$, $d_i$) becomes obvious each pair shares a common connection.

FIG. 4 illustrates an application mapping 400 for the embodiment of FIG. 2. A data a1 originating from application client AC1 can be a request Req (a1) requesting for a data from the application server 210. The Req (a1) observed by the monitoring device 212 is a data string String(a1). After the a1 is received by the application server 210 and forwarded to the database server 216, a data d1 is returned. The response from the application server 210 is a Resp (d1) and observed by the monitoring device 212 as String (d1). Requests from other application clients AC2 and AC3 are similarly illustrated in FIG. 4. Generically speaking, the monitoring device 212 observes query requests $a_i$ coming from different application clients and also observes query responses $d_i$ back to the application clients. The monitoring device 212 can then map $a_i$->$d_i$ by connection.

Figure 5:
FIG. 5 illustrates application mapping between SQL query and SQL response.

FIG. 5 illustrates a SQL mapping 500 for the embodiment of FIG. 2. Each request Req ($a_i$) is translated at the application server 210 into one or more SQL statements SQL ($b_i$). The SQL statements may be for data manipulation, data control, or data definition. The SQL statements for data manipulation are of special interest for the invention. The SQL statements are then sent to the database server 216 for handling. The database server 216 will perform database operations according to the SQL statements and return responses $c_i$ to the application server 210. For SQL statement SQL (b1), the monitoring device 212 observes a string String (b1), and for response c1, the monitoring device 212 observes a string String (c1). The monitoring device 212 can map easily $b_i$->$c_i$ because of the nature of SQL query and response.

The remaining mapping between $a_i$ and $b_i$ and between and $d_i$ will enable the system to fully identify the real identity of a user requesting a data from an application client. The monitoring device 212 captures a data stream going through two monitoring points: switch X 208 and switch Y 214. The data captured are parsed and analyzed. A String (a1)) is parsed and the text portion analyzed and stored for comparison. The String (a1)) is acted upon by the application server 210 and translated into one or more SQL statements SQL (b1). The SQL (b1) is parsed by the monitoring device 212 and the text portion is compared with the stored text portion from String (a1). If the request from application client AC1 is for inserting a user "Paul," "Paul" as data will show up in String (a1) and SQL (b1). By comparing the text portion of the String (a1) and SQL (b1), the monitoring device 212 can then associate String (a1) to SQL (b1).

However, the mapping may not be precise and it is possible that the monitoring device 212 is not able to map a String ($a_i$) to a SQL ($b_i$) because the request may not involve a clearly defined text string. The monitoring device 212 has a second chance to make such association when SQL responses $c_i$ are compared with SQL queries $b_i$. As stated above, a SQL query $b_i$ is captured, parsed, and analyzed, and the text portion is stored for comparison. Similarly, a SQL response $c_i$ is also captured, parsed, and analyzed, and the text portion is stored for comparison. If the text portion of a stored SQL query matches a stored SQL response, then the monitoring device 212 can easily associate SQL ($b_i$) with response ($c_i$). This second comparison serves also to confirm and correct associations made during the first comparison.

Figure 6:
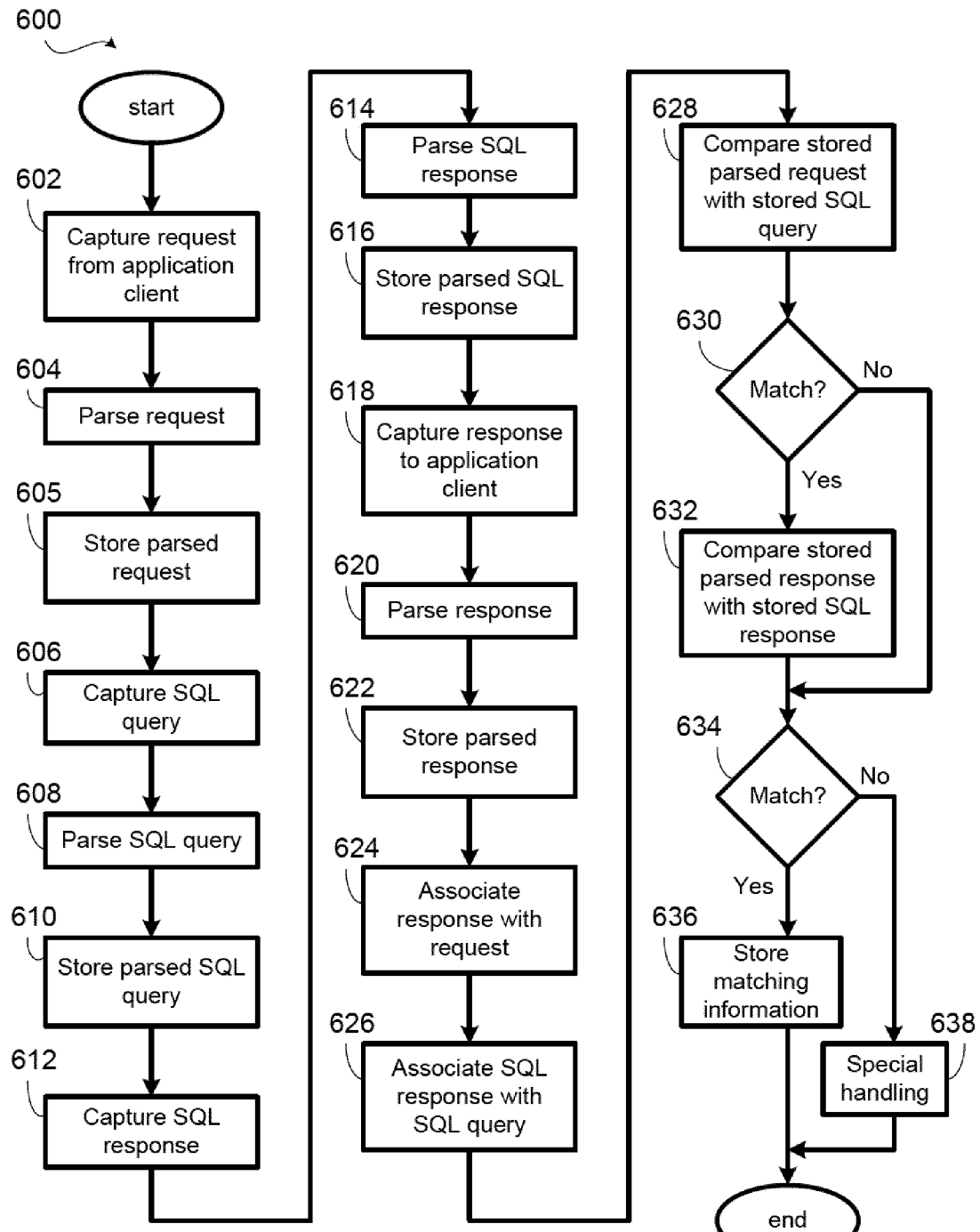
FIG. 6 is a flow chart according one embodiment of the invention.

FIG. 6 is a flow chart 600 illustrating a method according to the invention. The monitoring device 212 is connected to multiple monitoring points in network. At one monitoring point, the monitoring device 212 captures requests from application clients, step 602. The captured data is parsed, step 604, and stored, step 605 in the monitoring device 212. At another monitoring point, the monitoring device 212 captures SQL queries, step 606, parses them, step 68, and store them, step 610. The monitoring device 212 also captures, step 612, parses, step 614, and stores, step 616, responses from the database server 216 at yet another monitoring point. The response provided to the application clients is also captured, step 618, parsed, step 620, and stored, step 622, by the monitoring device 212 at the same monitoring point where the requests are captured or at yet another different monitoring point. After the requests, SQL queries and responses, and responses to the application clients are captured, the monitoring device 212 can associate a request with a response according to connections, time, and sequence, step 624. The monitoring device 212 can also easily associate a SQL query with its corresponding SQL response because of "first-in-first-out" order of processing by the database server 216, step 626. To complete the mapping between two sets of data, (request, response) and (SQL query, SQL response), the monitoring device 212 compares the parsed data associated with each set of data, step 628. If the request "a2" is to delete entry for "account 100" and the SQL query (b3) has a data portion with "account 100," the monitoring device 212 will match "a2" with "b3." If the request "a2" cannot be easily matched with a SQL query, the monitoring device 212 will compare the response associated with "a2" to the SQL response, step 632. If the response "d2" is associated with "a2" and includes a text "confirmed" and SQL response "c3" has text "confirmed," the monitoring device 212 can then associate "c3" with "d2." The association of "c3" to "d2" will then complete the mapping of "a2" to "b3" to "c3" to "d2," which in turn will identify the application client from which "a2" originated as the real client that generated SQL query that deleted "account 101." The identity of the user behind the application client can be observed during application user login. Alternatively, it can be easily revealed by checking client user login name, client computer name, or domain name. If the monitoring device 212 cannot match text portions of stored and parsed data, the monitoring device 212 will transaction will be flagged for special handling, step 638.

The method of the present invention can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a networking computer platform, such as a magnetic disk or tape, optical disk, hard disk, flash memory, or other storage media as is known in the art. A system 700 supporting such method is shown in FIG. 7.

Figure 7:
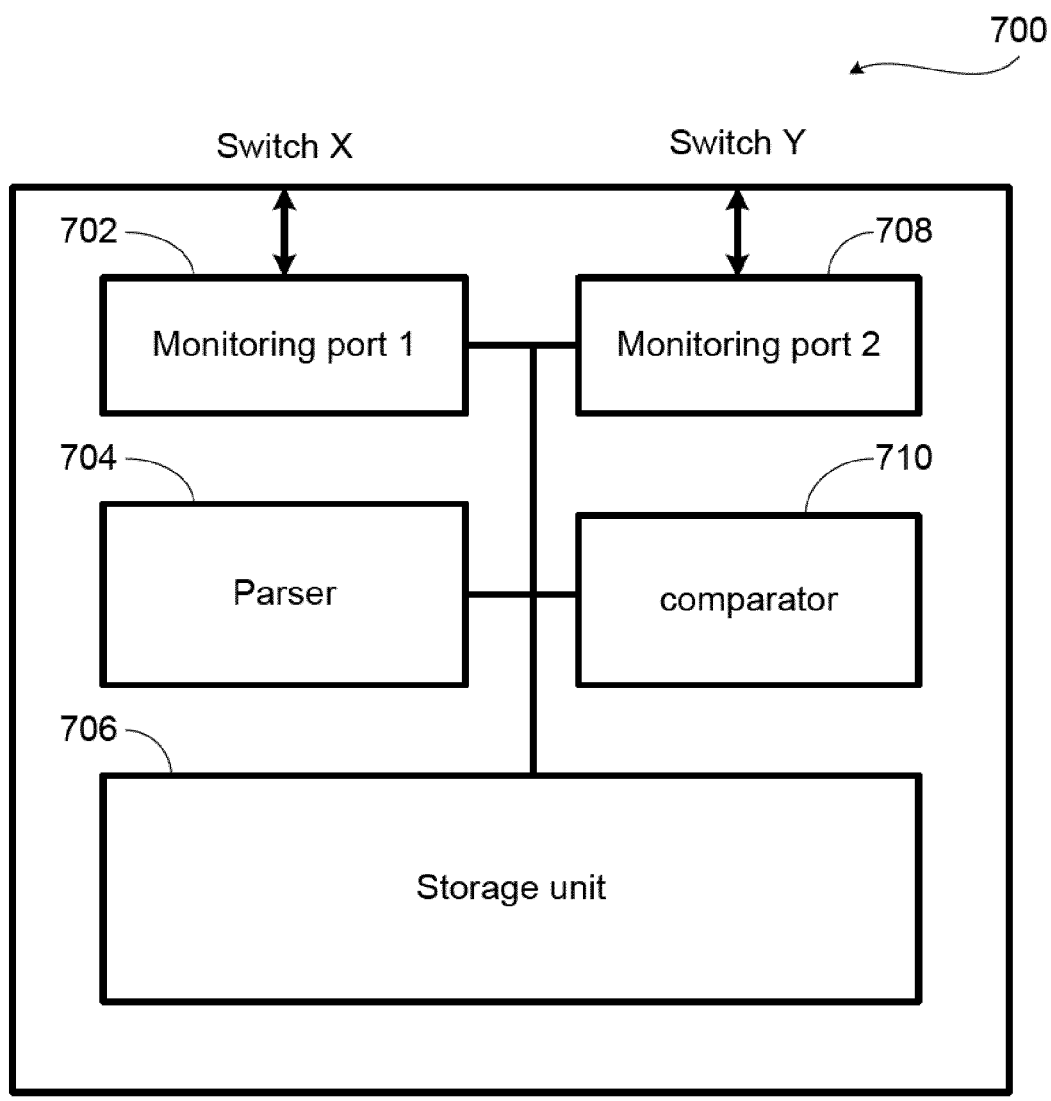
FIG. 7 is architecture of a system according to one embodiment of the invention.

FIG. 7 is architecture 700 for a monitoring device 212. The monitoring device 212 may have one or more monitoring port, 702, 708, for connecting to two or more monitoring points. The monitoring device 212 includes a parser 704, a comparator 710, and a storage unit 706. The parser 704 parses data captured by the monitoring ports, which include data requests and data manipulation commands, and store them in the storage unit 706. The comparator 710 compares the parsed and stored data from the storage unit 706 and determines whether there is any match. If there is a match, the comparator 710 will associate the data requests with the data manipulation commands and thus identifying the identity of a real user behind the data requests. Though separate parser 704 and comparator 710 are shown, they can easily be replaced by a controller or a CPU specially programmed for parsing and comparing functions.

In operation, a user may log into his home computer and use it to update a database located in his office server. The user's sends a request to select the entry corresponding to "Paul." The request is sent as data through a network to the application server. The application server receives the data, which is associated with a network address XYZ (a TCP/IP address) that identifies the user's home computer. The application server translates the select request to a SQL statement and sends the select request to the database server. The monitoring device captures the data from the user. The data (the select request) is parsed and stored in the monitoring device. The monitoring device identifies the text portion of the select request as related to "Paul." The SQL statement for the select request is also captured and parsed by the monitoring device. The monitoring device identifies the text portion of the SQL statement as related to "Paul" and matches the SQL statement with the select request previous stored. The monitoring device can then identify that an access to the database has been initiated by the user using a computer associated with the network address XYZ. If the user goes through a log in procedure at the application server, the monitoring device may also identify the user login account since communications between the application server and the application client (the computer used by the user) are monitored by the monitoring device.

If the monitoring device cannot match the select request with the SQL statement, the monitoring device will collect more information at a second monitoring point. The SQL statement is received by the database server, which will process and select the entry for "Paul." Both the SQL statement to and SQL response from the database server are monitored by the monitoring device. The SQL response is sent to the application server, which in turn sends the data response back to the user's home computer. The monitoring device parses the SQL response and the data response; the monitoring device sees them as related to "Paul" and then matches the SQL response with the data response. This checking between the parsed SQL response and the parsed data response can also served as a verification of the matching done previously between the SQL statement and the select request.

Though the description above is described using SQL statements, the invention is equally useful to database access that employs other query languages or access commands with similar characteristics.

In the context of FIG. 6, the steps illustrated do not require or imply any particular order of actions. The actions may be executed in sequence or in parallel. The method may be implemented, for example, by operating portion(s) of a network device, such as a network router or network server, to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The instructions when executed by a computer will enable the computer to perform the steps illustrated in FIG. 6.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described separately in this specification are foreseeable and within the scope of the invention.

What is claimed is:

1. A method for identifying the user identity of an application client accessing a database server by a monitoring device, the monitoring device being connected to a plurality of monitoring points, the monitoring device having at least one monitoring port, a parser, a comparator, and a storage unit, comprising the steps of:
   capturing a data request from an application client by at least one monitoring port at a first monitoring point, the data request having a data portion and no identifier being inserted by the application client for monitoring purpose;
   parsing the data request by the parser;
   translating the data request into at least one structure query language (SQL) instruction;
   capturing an SQL instruction from an application server by the at least one monitoring port at a second monitoring point, the SQL instruction having a data portion;
   parsing the SQL instruction by the parser;
   comparing, without using any identifier inserted by the application client for the monitoring purpose, the data portion of the parsed data request with the data portion of the parsed SQL instruction; and
   if there is a match between the data portion of the parsed data request and the data portion of the parsed SQL instruction, associating the parsed SQL instruction with the user identity associated with the parsed data request without using any identifier inserted by the application client for the monitoring purpose.

2. The method of claim 1, further comprising the steps of: storing the parsed data request in the storage unit; and storing the parsed SQL instruction in the storage unit.

3. The method of claim 1, further comprising the step of associating the data request with the user identity identified by a network address.

4. The method of claim 1, further comprising the step of associating the data request with the user identity identified by a login account.

5. The method of claim 1, further comprising the steps of:
   capturing an SQL response from a database server by the at least one monitoring port, the SQL response having a data portion and no identifier being inserted by the application client for monitoring purpose;
   parsing the SQL response by the parser;
   capturing a data response from the application server by the at least one monitoring port, the data response having a data portion;
   parsing the data response by the parser;
   comparing, without using any identifier inserted by the application client for the monitoring purpose, the data portion of the parsed data response with the data portion of the parsed SQL response; and
   if there is a match between the data portion of the parsed data response and the data portion of the parsed SQL response, associating the parsed SQL response with the user identity associated with the data response without using any identifier inserted by the application client for the monitoring purpose.

6. The method of claim 5, further comprising the step of associating the data response with a user identity identified by a network address.

7. A monitoring device for identifying the user identity of an application client accessing a database server, comprising:
   at least one monitoring port for connecting to a plurality of monitoring points and monitoring data at the plurality of monitoring points;
   a parser for parsing data captured by the at least one monitoring port;
   a comparator for comparing the parsed data; and
   a storage unit for storing the captured data and the parsed data, wherein
   the at least one monitoring port captures a data request from an application client at a first monitoring point, the data request having a data portion;
   translating the data request into at least one structure query language (SQL) instruction;
   capturing an SQL instruction from an application server by the at least one monitoring port at a second monitoring point, the SQL instruction having a data portion;
   the parser parses the data request from an application client and the SQL instruction from the application server captured by the at least one monitoring port, the data request and the SQL instruction containing no identifier inserted for monitoring purpose, and
   if there is a match between the data portion of the parsed data request and the data portion the parsed SQL instruction, the comparator associates the parsed SQL instruction with the user identity associated with the data request without using any identifier inserted by the application client for the monitoring purpose.

8. The monitoring device of claim 7, wherein there are two monitoring ports connected to two separate monitoring points.

9. The monitoring device of claim 7, wherein
   the at least one monitoring port captures a SQL response from the database server, the SQL response having no identifier inserted for the monitoring purpose,
   the parser parses the SQL response,
   the at least one monitoring port captures a data response from the application server, the data response having no identifier inserted for the monitoring purpose,
   the parser parses the data response, the comparator compares the parsed SQL response with the parsed data response without using an identifier inserted for the monitoring purpose; and if there is a match between a data portion of the parsed data response and a data portion of the parsed SQL response, the comparator associates the parsed SQL response with the user identity associated with the data response without using any identifier inserted by the application client for the monitoring purpose.

10. A non-transitory computer-readable medium containing a computer program for identifying the user identity of an application client accessing a database server through a monitoring device, the monitoring device being connected to a plurality of monitoring points, the monitoring device having at least one monitoring port, a parser, a comparator, and a storage unit, the computer program when executed by the monitoring device causes the monitoring device to perform the following steps:

capturing a data request from the application client by at least one monitoring port at a first monitoring point, the data request having a data portion and no identifier inserted by the application client for monitoring purpose;

parsing the data request by the parser;

translating the data request into at least one structure query language (SQL) instruction;

capturing a SQL instruction from an application server by the at least one monitoring port at a second monitoring point, the SQL instruction having a data portion;

parsing the SQL instruction by the parser;

comparing, without using any identifier inserted by the application client for the monitoring purpose, the parsed data request with the parsed SQL instruction; and if there is a match between the data portion of the parsed data request and the data portion of the parsed SQL instruction, associating the parsed SQL instruction with the user identity associated with the data request without using any identifier inserted by the application client for the monitoring purpose.

11. The computer program in the non-transitory computer-readable medium of claim 10, further causing the monitoring device to perform the steps of:

storing the parsed data request in the storage unit; and storing the parsed SQL instruction in the storage unit.

12. The computer program in the non-transitory computer-readable medium of claim 10, further causing the monitoring device to perform the step of associating the data request with a user identity identified by a network address.

13. The computer program in the non-transitory computer-readable medium of claim 10, further causing the monitoring device to perform the step of associating the data request with a user identity identified by a login account.

14. The computer program in the non-transitory computer-readable medium of claim 10, further causing the monitoring device to perform the steps of:

capturing a SQL response from the database server by the at least one monitoring port, the SQL response having a data portion and no identifier inserted for the monitoring purpose;

parsing the SQL response by the parser;

capturing a data response from the application server by the at least one monitoring port, the SQL response having a data portion and no identifier inserted for the monitoring purpose;

parsing the data response by the parser;

comparing the parsed SQL response with the parsed data response without using an identifier inserted for the monitoring purpose; and if there is a match between the data portion of the parsed data response and the data portion of the parsed SQL response, associating the parsed SQL response with the user identity associated with the data response without using any identifier inserted by the application client for the monitoring purpose.

15. The computer program in the non-transitory computer-readable medium of claim 14, further causing the monitoring device to perform the step of associating the data response with a user identity identified by a network address.

16. The method of claim 5, further comprising the step of associating the data request with a user identity identified by a login account.

17. The computer program in the non-transitory computer-readable medium of claim 14, further causing the monitoring device to perform the step of associating the data request with a user identity identified by a network address.

18. The computer program in the non-transitory computer-readable medium of claim 14, further causing the monitoring device to perform the step of associating the data request with a user identity identified by a login account.

* * * * *